UNITED STATES PATENT OFFICE 2,364,215

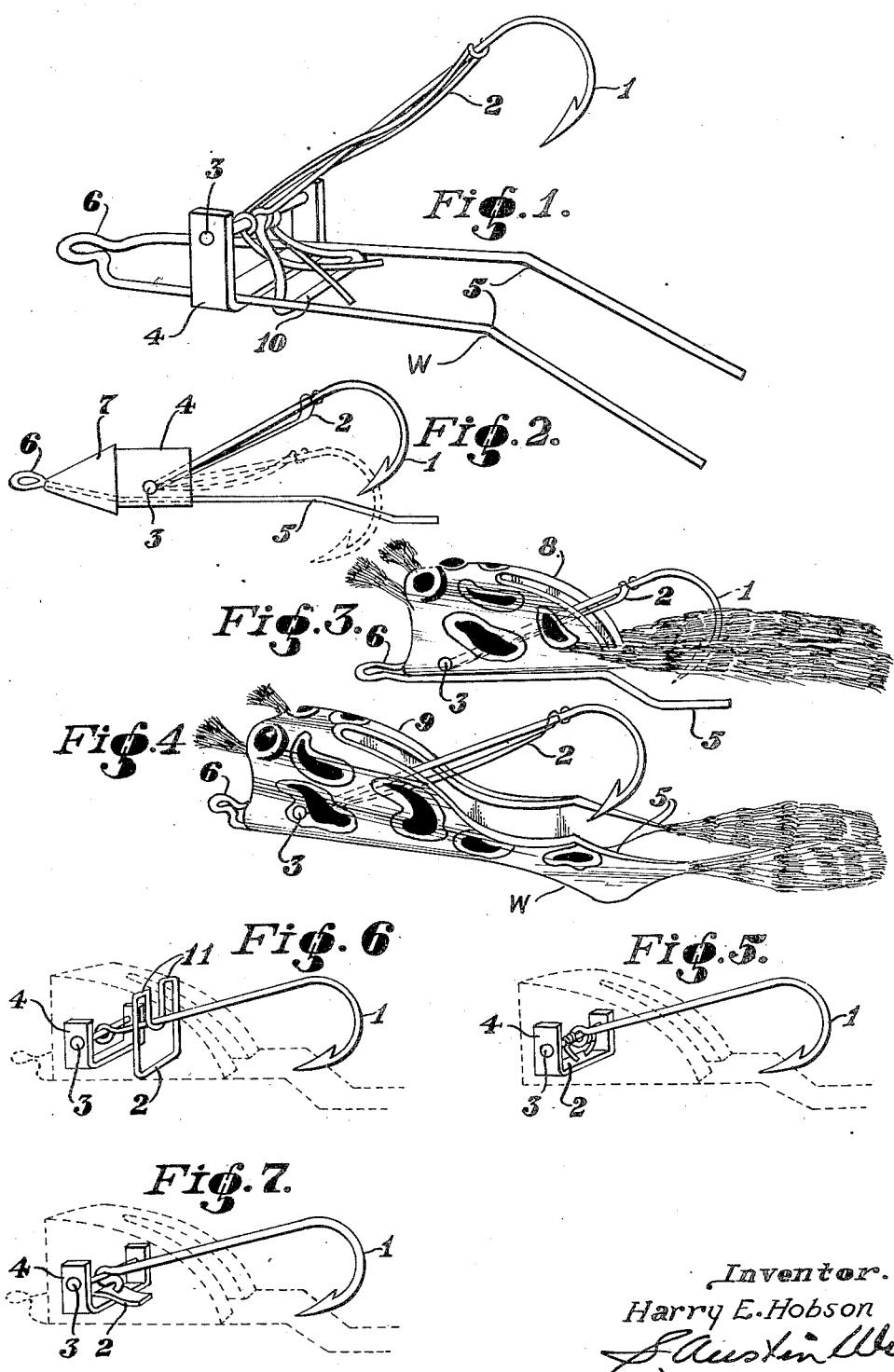

SELF-SETTING RETRACTOR HOOK

Harry E. Hobson, Dallas, Tex.

Application February 18, 1941, Serial No. 379,403

5 Claims. (Cl. 43—39)

This invention concerns a self-setting retractor hook with disgorging feature for use of the angler fishing with artificial or live bait. The mechanism comprehends the use of a fish hook together with a hook-setting guard which is preferably made of a plurality of members. The function of the guard is twofold: First to "set" the hook, and second to prevent the hook from catching in weeds or other foreign materials or obstructions to be found in the water. The hook itself is to be kept in guarded or retracted position by the use of suitable means of spring or elastic character which can be activated to allow the movement of the hook through the guard and so expose it that it may catch the fish. Yet until the fish strikes or bites or takes the bait the hook is kept normally in protected position. The entire device is so built and used that the struggles of the fish cause quick and further penetration of the hook; and yet the hook is more easily disengaged from the fish's mouth.

The usual arrangements of protected hooks now found on the market fall short of providing the novel features found in this invention. For instance, it is usual to find on the market devices called "weedless" hooks in which some type of guard prevents weeds hanging on the hook. On the other hand there are various devices presently available which by spring means or other means with the use of triggers and the like cause the hook to be thrown into the fish by some force other than the activity of the fish himself. Such devices are sometimes referred to as "traps" or spring activated hooks. The present invention does not work in any such fashion, nor does it have any such purpose. The fish hooks himself with the use of this invention, and in the process such elastic or spring means as may be found in this device do not contribute to this end. On the other hand the curve or angle of the guard, together with the pull of the fish (and not the spring), works to force the hook into the flesh of the fish; and this invention may therefore be properly referred to as a self-setting hook.

The mechanism here disclosed has certain definite objects and purposes which show a distinct advantage and advance in the art. This device in fact works in a manner contrary to that usually found in ordinary commercial devices which utilize some kind of a spring.

In this invention elastic or spring means is employed to keep the hook retracted well within the guard and thus prevent it being entangled with weeds, moss, rocks, other obstructions and even the fingers of the fisherman. However, in retracted position the back of the hook itself presents a gentle, smooth, curved line which is without obstruction and can be easily swallowed by the fish, or contacted by him without immediate engagement of the hook in his mouth. However, it is to be noted that as the fish takes the bait and closes his mouth over the bait and the hook his activity in so doing forces the point through the guard into an exposed position where it will engage the fish. A lateral projection of the guard forces the hook to a deeper set as the fish moves away. This feature is quite novel and presents a distinct advantage in angling equipment.

In this invention after the fish has been caught the disengaging of the hook is greatly facilitated by the simple process of pressing downwardly and into the fish's mouth the entire bait assembly. In this process it will be seen that the fingers of the guard press downwardly against the flesh of the fish and tend to open his mouth and at the same time the hook is loosened and backed out of the flesh. As the hook is loosened and while the guard is keeping the flesh in place the retractor spring means restores the hook to normal position, which is well within the guard and out of engagement.

Therefore it will be seen that this invention presents a distinctly new and novel approach to two problems which the angler has faced in the past and furnishes him suitable mechanism for handling both. These problems are the quick setting of the hook, and later the disengaging of the hook.

Convenient means is here shown by which the hook is automatically kept out of position of engagement with any object which it may be caused to pass. The actual engagement of the hook into the flesh of the fish is caused by the activity of the fish himself in pressing upon the back of the hook and pulling against the laterally inclined guard while attempting to eat or swallow the bait, and by no other means. The disengagement of the hook from the fish's mouth is greatly facilitated by the retractor means, activated by spring or resilient or elastic material, so that when the hook is slightly loosened such means actually causes the disengagement of the hook and further causes the hook to resume its normal position of concealment well within the guard.

One of the primary objects of this invention is to provide practical and simple and dependable and inexpensive mechanism for retracting a fish hook to a position within a guard so that when castings are made or the hook is moved in the water foreign objects will not be engaged by the hook and the hook will not snag.

Another object is to provide means whereby the hook is kept normally in a position of retraction, that is to say, in a guarded or protected position; and to provide this means so that it works automatically to return the hook to protected position after it shall heave been forced into naked or exposed position.

A further object of this invention is to provide a fish hook with mechanism that while normally maintaining the hook in a guarded position will nevertheless allow it to be easily and quickly thrust into a position of engagement by the action of the fish himself (and not by any other force).

A still further and desirable object of the invention is to provide suitable mechanism whereby the disengagement of the hook from the mouth of the fish is more easily brought about.

A primary object is to furnish mechanical means for "setting" the hook once the fish takes the bait, such means to be made effectual by a structure providing a "wedging action" between the guard and the barb of the hook as a result of pulling away by the fish.

A very important object of this invention is to provide a simple but complete mechanical retractor unit including an automatically retracted and guarded fish hook in simple assembly so that this unit may be delivered to various concerns engaged in the business of making artificial bait and by them quickly attached and cheaply assembled in such artificial bait.

Another object is to provide such a unit so that it may be with equal facility used with live or fresh bait of every kind ordinarily used by fishermen.

In the accompanying drawing:

Figure 1 shows the guarded retractor hook unit of a typical or preferred form ready to be attached to the fish line and baited and used, or ready to be assembled in connection with artificial bait with provision for attachment thereto.

Figure 2 shows a typical form of this unit which, in addition to providing a weedless hook also provides a weedless head which in this instance is of conical shape; and this figure illustrates the position of the hook when struck by the fish and the barb or point of the hook caused to be exposed beyond the guard so as to catch the fish.

Figure 3 shows a form of feathered bug to which the unit has been affixed. Obviously this form is only one of a multitude to which the unit may be attached, as may suit the fisherman's fancy.

Figure 4 shows the retractor hook affixed within an artificial bait appearing to be a frog whose hind legs themselves afford the guard within which the hook may be retracted and through which the hook may be forced into a position of engagement when the fish bites. Also it is to be noted that this guard is in such form as to present a "wedge" which will help to force the hook to penetrate the flesh of the fish.

Figure 5 shows one form of the means for keeping the hook in retracted position in which form such means appears as a coiled spring.

Figure 6 presents another means for retracting the hook, the means here being a rubber band. This band encircles the body of the bait and the hook rests on the band.

Figure 7 shows yet another means for normally holding the hook in retracted and guarded position; and this means is here presented as a flat band of spring steel such as a watch spring.

Of course other modifications of the structure in its several parts may be made and still be found within the ambit of this specification so that the general purposes may be carried out.

In the drawing the numeral 1 designates the fish hook. Numeral 2 indicates mechanical means for retracting or elevating the hook. Such means may be provided by springs or resilient or elastic materials. 3 is a pin on which the hook is movably mounted to allow partial rotation. 4 is a frame or other means for holding the pin and the guard and other necessary parts of the unit assembled together in operable relation.

The forcing guard 5, 5a, 5b, 5c may be made with a plurality of members, such as a pair of wires 5, 5a, 5b, or a slotted frame 8, 9, or an extended part 5c of the artificial bait itself. Obviously a singly wire or member may be used as a guard, as a plurality of parts to the guard is not absolutely necessary. 6 shows an eyelet or loop or hole for fastening the unit to the fishing line. 7 shows a weedless protector at the forward end of the unit which in this instance is made of conical shaped material to avoid entangling the head of the unit or of the bait with weeds and such.

In Figures 5, 6 and 7 are shown suitable means for retracting the hook; and such means designated by numerals 2a, 2b, and 2c in these figures discloses a coil spring, a rubber band and a watch spring respectively; but such means may be provided by other suitable materials, of course. Numeral 2 in Figure 1 indicates another form of spring. In Figure 6 the numeral 2b indicates a rubber band passing entirely around the bait body and held in place thereon by notches 11 on the sides or corners of the body (indicated in dotted outline).

A feathered bug 8 is a typical artificial bait within the body of which may be mounted the retractor hook unit so that the hook itself extends through a hook-slot, and 9 shows a frog form of artificial bait as an example of such bait constructed so that the legs of the animal, or other suitable branches extending from the body thereof may be made to form the guard for the hook; and likewise these branches may be suitably formed to provide the "wedge" which will force the hook into the fish as he attempts to pull away. This "wedge" or lateral projection of the guard 5, 5a, 5b, 5c is indicated in all of the figures of the drawing as an angular or curved extension of the guard itself; but because of its importance as a mechanical means to set the hook after the fish strikes, it has been marked with the letter W in Figures 1 and 4. In Figure 1 this projection is angular, and in Figure 4 it is curved.

Numeral 10 indicates a suitable clevis-guide made of some such suitable material as spring wire or a band of spring steel roughly U-shaped with holes in the two free ends thereof for affixing on the pin 3 so that one end of the clevis is on one side of the hook 1 and the other end on the other side with the broader and closed end of the clevis disposed between the guide rails 5. This clevis-guide acts as a spring clamp gently pressing against each side of the eye of the hook and returns the hook to proper alignment of approximately ninety degrees from the axis of the pin 3 and prevents it from hanging or becoming accidentally engaged with the guide 5 or the side walls of the hook-slot through which the hook moves within the body of the artificial bait which may be superimposed upon the retractor hook unit.

In operation this self-setting retractor hook unit is simple yet positive. Whether used with artificial bait or with live bait the mechanical operation is the same.

When the fish attempts to close his mouth over the baited unit the point of the hook is in protected and retracted position, and the fish does not at first feel the point of the hook. In fact the first contact which the fish has with the hook is with the smooth, curved back of the hook, and this smooth surface does not annoy him at all. In attempting to swallow or further take the gait the fish closes his mouth over the bait and over the smooth back of the hook, and when he does so he forces the point of the hook downwardly between the sides of the guard and out into exposed position. When the hook moves to this position it will probably slightly prick the fish and cause him to attempt to withdraw. In withdrawing the fish cannot move off of the bait in a straight line because of the lateral projections or extensions of the guide. Such projections force a somewhat lateral movement of the fish's mouth and a further movement of the point of the hook to deeper penetration, and in this operation the hook is said to be "set." The "wedge" action occasioned by the lateral projections from the guard is a very important part of this invention.

The automatic wedging action of the guard insures, almost to a certainty, that once the bait is taken the fish sets the hook by such action and he cannot escape even if the line is slack or unattended. This is to be contrasted with the use of ordinary bait where it is necessary to give a sudden jerk to the line in order to firmly hook the fish and proper timing of this act of jerking the line is important and ordinarily has much to do with the fisherman's success. Due to the poor timing of this act many fish escape as they apparently discover their predicament before the fisherman acts. No such close attention or timely action is required of the fisherman using this invention in which the hook is set automatically.

In removing the fish from the hook this device is of considerable utility and convenience. The fisherman simply grasps that part of the bait usually found extending from the fish's mouth and presses downwardly with the entire bait assembly. The lateral extensions of the guard are thus forced deeper into the fish's mouth and cause his mouth to open wider. Greater tension of the retractor spring is brought about which tends to restore the hook to its normal retracted position. A little shaking of the bait assembly in the fish's mouth usually helps to loosen the hook and facilitate its disengagement and return to guarded position.

Repair of the bait assembly is simple whenever the retractor spring breaks. The fisherman has only to place a rubber band around the bait body and pass it underneath the shank of the hook to cause retraction of the hook as before.

I claim:

1. In fishing tackle, an artificial bait provided with a body portion, substantially parallel spaced members extending rearwardly therefrom affording a pair of opposed planes, a lateral enlargement of each plane near its terminus, a pin carried transversely in the body portion, a fish hook movably mounted on the pin and adapted to pass between the planes, and resilient means adapted to normally keep the point of the hook without the space between the planes.

2. In fishing tackle, an artificial bait provided with a body portion, substantially parallel spaced members extending rearwardly therefrom affording a pair of opposed planes, a pair of guard members extending rearwardly from the body and each provided with a lateral projection in substantial alignment with one of the planes, a pin carried transversely in the body portion, a fish hook movably mounted on the pin and adapted to pass between the planes, and resilient means adapted to normally keep the point of the hook without the space between the guard members.

3. In fishing tackle, a fish hook, a shaft passing through the eye of the hook, a pair of guard members in spaced relation and adapted to allow the passage of the point of the hook therebetween, a frame on which said guard members are mounted, means for rigidly attaching the shaft to the frame, and spring means for normally maintaining the shank of the hook at approximately a right angle relation to the axis of the shaft, said spring means being adapted to momentarily allow lateral deflection of the shank of the hook.

4. In fishing tackle, a pair of spaced guard members, a pin carried by said guard members in transverse relation thereto, a fish hook loosely mounted upon the pin, and resilient means for restoring the shank of the fish hook to a position of approximately 90 degrees from the axis of the pin whenever it has been deflected therefrom.

5. In fishing tackle, a fish hook guard, a pin carried by the guard, a fish hook movably mounted on the pin, and automatic spring means adapted to normally maintain the shank of the hook in a plane approximately parallel to the axis of the guard but allowing its momentary deflection therefrom.

HARRY E. HOBSON.